(12) United States Patent
Okamoto

(10) Patent No.: US 8,098,379 B2
(45) Date of Patent: Jan. 17, 2012

(54) PLANAR LIGHTWAVE FOURIER-TRANSFORM SPECTROMETER

(75) Inventor: Katsunari Okamoto, Kanagawa (JP)

(73) Assignee: AiDi Corporation, Ibaraki (JP)

( * ) Notice: Subject to any disclaimer, the term of this patent is extended or adjusted under 35 U.S.C. 154(b) by 208 days.

(21) Appl. No.: 12/710,765

(22) Filed: Feb. 23, 2010

(65) Prior Publication Data

US 2010/0245831 A1    Sep. 30, 2010

Related U.S. Application Data

(60) Provisional application No. 61/154,827, filed on Feb. 24, 2009.

(51) Int. Cl.
    *G01J 3/45*    (2006.01)
(52) U.S. Cl. ......................................................... 356/451
(58) Field of Classification Search ................... 356/451
    See application file for complete search history.

(56) References Cited

U.S. PATENT DOCUMENTS

| | | | | |
|---|---|---|---|---|
| 6,049,640 | A | * | 4/2000 | Doerr ................................ 385/15 |
| 6,175,671 | B1 | | 1/2001 | Roberts |
| 6,845,185 | B2 | * | 1/2005 | Kim et al. ......................... 385/14 |
| 7,317,535 | B2 | | 1/2008 | Cheben et al. |
| 2006/0039704 | A1 | | 2/2006 | Nara et al. |
| 2009/0316159 | A1 | * | 12/2009 | Scott .............................. 356/454 |

OTHER PUBLICATIONS

Notification of Transmittal of the International Search Report and the Written Opinion of the International Searching Authority, International Search Report and Written Opinion, issued for PCT/US2010/025040, dated Sep. 30, 2010.

Cheben et al., "Multiaperture Planar Waveguide Spectrometer Formed by Arrayed Mach-Zehnder Interferometers", Optics Express, vol. 15, No. 26, 18176-18189 (Dec. 24, 2007).
Florjanczyk et al., "Multiaperture Planar Waveguide Spectrometer Formed by Arrayed Mach-Zehnder Interferometers", Optics Express, Vo. 15, No. 26 (Dec. 2007).
Cheben et al., "Wavelength-Dispersive Device Based on a Fourier-Transform Michelson-Type Arrayed Waveguide Grating", Optics Letters, vol. 30, No. 14 (Jul. 15, 2005).
Bacon et al., "Miniature Spectroscopic Instrumentation: Applications to Biology and Chemistry", Review Article, Review of Scientific Instruments, vol. 75, No. 1 (Jan. 2004).
Harlander et al., "Spatial Heterodyne Spectroscopy for High Spectral Resolution Space-Based Remote Sensing", Optics & Photonics News (Jan. 2004).

* cited by examiner

*Primary Examiner* — Tarifur Chowdhury
*Assistant Examiner* — Jonathon Cook
(74) *Attorney, Agent, or Firm* — Jeff Klembczyk, Esq.; Kevin P. Radigan, Esq.; Heslin Rothenberg Farley & Mesiti P.C.

(57) ABSTRACT

A transform spectrometer implemented on a planar waveguide circuit (PLC), having an input optical signal waveguide carrying an input optical signal to be analyzed; a plurality of couplers, each connected to the input optical signal waveguide, and each including a coupler output for carrying a coupled optical signal related to the input optical signal. An array of interleaved, asymmetrical waveguide Mach-Zehnder interferometers (MZI) is formed on the PLC, each having at least one input MZI waveguide, each MZI input waveguide receiving a coupled optical signal from a respective coupler output; wherein at least some of the input MZI waveguides intersect in a common layer of the PLC, at an angle which allows their respective coupled optical signals to transmit without unacceptable attenuation. This arrangement improves spatial efficiency of the PLC, allowing more MZIs to be implemented, resulting in increased spectral resolution.

14 Claims, 15 Drawing Sheets

PLANAR LIGHTWAVE FOURIER-TRANSFORM SPECTROMETER

RELATED APPLICATION INFORMATION

This Application claims the benefit of U.S. Provisional Patent Application 61/154,827, filed Feb. 24, 2009 entitled "Planar Lightwave Fourier-Transform Spectrometer," which Application is hereby incorporated by reference herein in its entirety.

TECHNICAL FIELD

This invention relates in general to planar lightwave circuits. More particularly, the present invention relates to a planar lightwave, Fourier-transform spectrometer.

BACKGROUND OF THE INVENTION

There is a growing need to develop miniature spectroscopic sensors capable of real-time sensing of biological and environmental materials. For example, broad-bandwidth, high-spectral-resolution optical detection of human breath has identified multiple important biomarkers correlated with specific diseases and metabolic processes.

As an introduction to planar lightwave Fourier-Transform spectrometers, coupling light into single-mode waveguides is often difficult in most integrated-optic sensors such as arrayed waveguide gratings (AWGs), ring resonators, and Mach-Zehnder interferometers (MZIs). In the case of silicon waveguides, very fine and smooth etching of the taper tips down to ~80 nm is required to realize a low-loss spot-size converter. The primary advantage of planar lightwave Fourier-transform spectrometers is their relatively easy light coupling and a high optical throughput.

Spatial heterodyne spectroscopy (SHS) is an interferometric Fourier-transform technique based on a modified Michelson interferometer with no moving parts and relies on analysis of stationary interference patterns. In bulk-optic SHS, the mirrors of the Michelson interferometer are replaced by diffraction gratings. This bulk-optic, SHS instrument is more practical than traditional Fabry-Perot and Michelson Fourier-transform spectrometers because of its relaxed fabrication tolerances and ability to correct for interferometer defects and misalignments in data analysis. In addition, the instrument can be field widened without moving parts to achieve high sensitivity.

Early proposals for planar waveguide SHS devices were inspired by known configurations of static Fourier transform spectrometers in bulk optics. A waveguide SHS spectrometer can be formed by interleaving two waveguide phase arrays having opposite dispersion. The interleaved arrays produce two wavefronts that propagate and mutually interfere in the slab waveguide, yielding wavelength-dependent fringes. This is due to the different dispersion of the arrays which makes the wavefronts intersect at different angles for different wavelengths thus forming wavelength-dependent fringe patterns. In general, the input spectrum is related to the fringe pattern via Fourier transform since any input signal can be decomposed into its monochromatic constituents. This interleaved AWG arrangement allows using a wider input waveguide width compared to a standard AWG of similar spectral performance. The interleaved AWG, however, produces (in the combiner free propagation region) its distinct spatial Talbot effects, and the superposition of these Talbot patterns yields a spatial Moiré pattern. Signal retrieval from the complicated Moiré-Talbot pattern requires complicated numerical procedures.

SUMMARY OF THE INVENTION

Disclosed herein is a miniature spectroscopic sensor based on a planar lightwave Fourier-transform spectrometer. The primary advantages of interferometric Fourier-transform spectrometers are a high optical throughput, compact size, and a relatively easily attained high resolution. In addition to the large throughput advantage, an additional benefit of Fourier-transform spectrometers compared to grating-based devices is that the spectral information can be measured at all wavelengths simultaneously.

In that regard, the present invention, in one aspect, is directed to a transform spectrometer implemented on a planar waveguide circuit (PLC), having an input optical signal waveguide carrying an input optical signal to be analyzed; a plurality of couplers, each connected to the input optical signal waveguide, and each including a coupler output for carrying a coupled optical signal related to the input optical signal; an array of interleaved, asymmetrical waveguide Mach-Zehnder interferometers (MZI), each having at least one input MZI waveguide, each MZI input waveguide receiving a coupled optical signal from a respective coupler output; wherein at least some of the input MZI waveguides intersect in a common layer of the PLC, at an angle which allows their respective coupled optical signals to transmit without unacceptable attenuation. The input MZI waveguides intersect with each other greater than about 45°; and dummy crossing waveguides may be used such that the total number of waveguide crossings is equal for each MZI waveguide.

A three dimensional spectrometer system is also disclosed, containing multiple stacked PLCs, each having a transform spectrometer.

Other performance improvements are disclosed, such as collimating waveguide lens array formed on the PLC adjacent to at least one of the output MZI waveguides, for providing a collimated output signal from the output MZI waveguide to a respective portion of the detector array; and a plurality of heaters, each of which is affixed to a respective MZI, to correct phase errors in the spectrometer.

These structures, methods for their manufacture, and methods of their use as a spectrometer, also form part of the invention.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
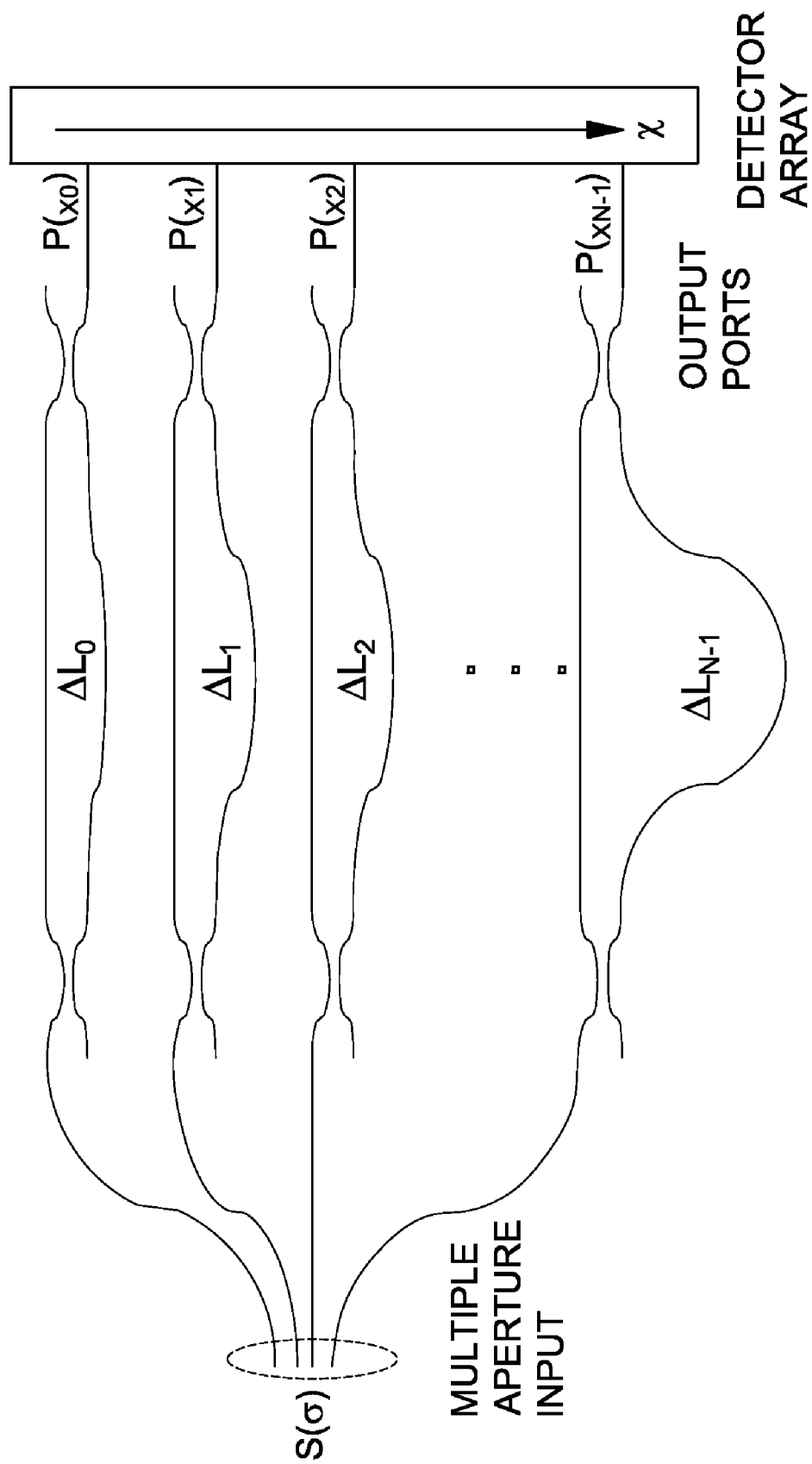
FIG. 1 depicts a spatial heterodyne spectrometer formed by an array of waveguide MZIs.

The waveguide SHS concept discussed above can be generalized into a waveguide MZI array as shown in FIG. 1, and as discussed in M. Florjańczyk, P. Cheben, S. Janz, A. Scott, B. Solheim, and Dan-Xia Xu, "Planar waveguide spatial heterodyne spectrometer", Proc. of SPIE, vol. 6796, pp. 67963J1-J10, 2007, the entirety of which is hereby incorporated herein by reference.

For spatially coherent light, a waveguide configuration is possible that consists of independent interferometric structures, each of which samples the input wavefront at a different location. This allows using multiple input apertures simultaneously. The advantage of such an arrangement is the increase in optical throughput. Path length difference in each asymmetrical MZI increases by $\Delta L$, similar to an AWG. With a greater number of MZIs, finer spectral resolution can achieved. However, the simplistic layout method of simply stacking multiple MZIs as shown in FIG. 1 does not allow an increase in the number of MZIs in a limited wafer size.

Figure 2:
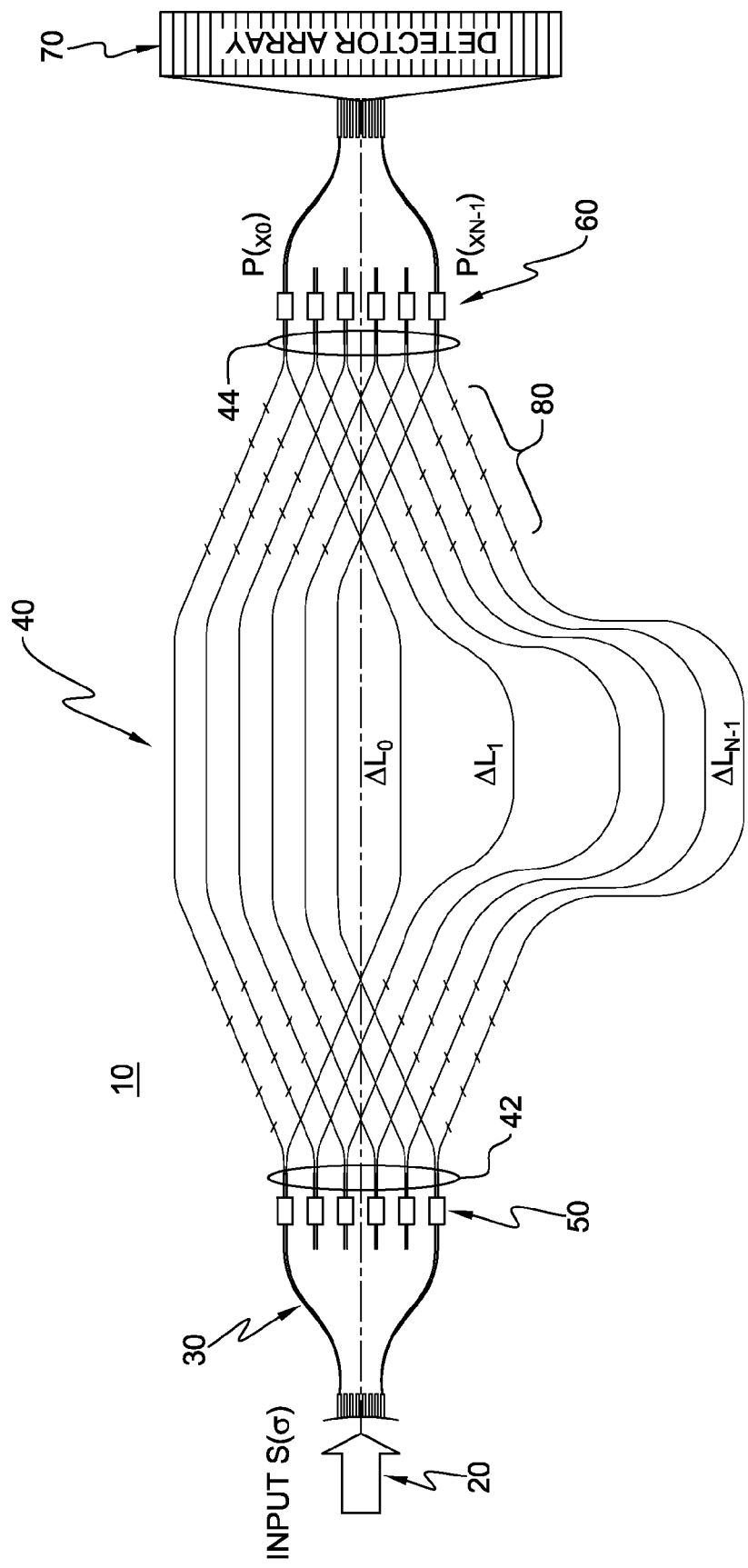
FIG. 2 depicts a planar lightwave Fourier-transform spectrometer with interweaved MZIs, in accordance with one aspect of the present invention.

Disclosed herein is an improved planar lightwave Fourier-transform spectrometer 10 with an interweaved MZI configuration as shown in FIG. 2. In this configuration, spatially coherent input light 20 excites respective waveguides 30 which are connected to MZ interferometers 40. 3-dB couplers 50 consisting of, e.g., directional couplers or multimode interference (MMI) couplers into the two asymmetric branches of the MZIs via MZI input waveguides 42.

Waveguide arms in the MZIs may be intentionally inclined to both sides such that the waveguides intersect by more than 45° with each other. The excess loss of the waveguide crossing can be reduced as low as ~0.02 dB/intersection if the crossing angle is larger than, e.g., 45° as discussed in T. Kominato, T. Kitoh, K. Katoh, Y. Hibino, and M. Yasu, "Loss characteristics of intersecting silica-based waveguides", Optoelectronics Conf. OEC 1992, Makuhari Japan, paper 16B4-1, pp. 138-139, July 1992, the entirety of which is hereby incorporated herein by reference.

The arm length difference may in one example increase by a discrete value $\Delta L$ from one MZI to another. The interference signals of each asymmetrical MZI are collected by the MZI output waveguides 44, and provided by couplers 60 to detector array 70. As discussed further below, both cross port p(k) and through port q(k) outputs can be provided by each coupler.

The disclosed waveguide layout allows almost 4 times more MZIs than the layout method in FIG. 1, for the same chip size. In the disclosed layout, and in accordance with the present invention, dummy crossing waveguides 80 can also be placed across MZI input waveguides 42 and output waveguides 44 such that the total number of waveguide crossings becomes equal for every MZI waveguide.

Figure 3B:
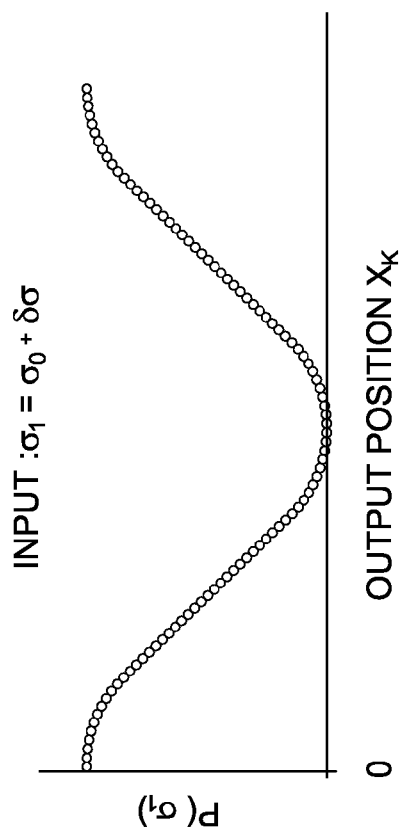
FIG. 3 depicts fringe patterns at the detector array as follows: (a) uniform distribution of the output power when the input is monochromatic at the Littrow wavenumber $\sigma_0$, (b) fringe pattern when the monochromatic input is shifted from $\sigma_0$ by the wavenumber resolution $\delta\sigma$, (c) fringes for a monochromatic input at $\sigma_n$, and (d) fringe pattern when multiple wavenumbers are present in the input signal.
Figure 3D:
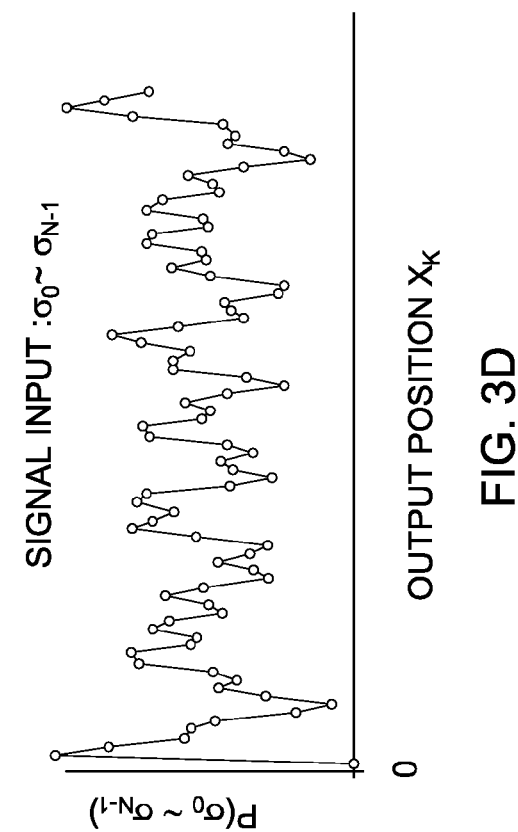
Figure 3A:

The operating principle of the disclosed spectrometer can be understood as follows. For a given monochromatic input, different transmission characteristics of each MZI result in a different power value at its output. In general, a monochromatic input results in a periodic (sinusoidal) spatial distribution of power across the different output ports $P(x_k)$, which is the Fourier transform of the monochromatic input spectrum. Since the spatial power distribution $P(x_k)$ and the input spectrum are a Fourier transform pair, a polychromatic input produces a power distribution from which the input spectrum can be calculated using Fourier transformation. The MZI array can be designed such that for a particular monochromatic input of a wavenumber $\sigma_n=1/\lambda_n$, a constant spatial power distribution is obtained at the output, as shown in FIG. 3a. This can be denoted as the Littrow condition, with the zero spatial frequency corresponding to the Littrow wavenumber $\sigma_0=1/\lambda_0$. At the Littrow condition, the phase delays in different MZIs are integer multiples of $2\pi((2\pi/\lambda_0)n_c\Delta L=2m\pi)$, thus yielding the constant $P(x_k)$. As the wavenumber of the monochromatic input $\sigma$ changes from the Littrow value, the output power distribution becomes periodic with the spatial frequency increasing with $(\sigma-\sigma_0)$. Changing the wavenumber from the Littrow condition to $\sigma_0+\delta\sigma$, where $\delta\sigma$ is the instrument resolution, results in one spatial fringe along the output ports as shown in FIG. 3b.

Figure 3C:
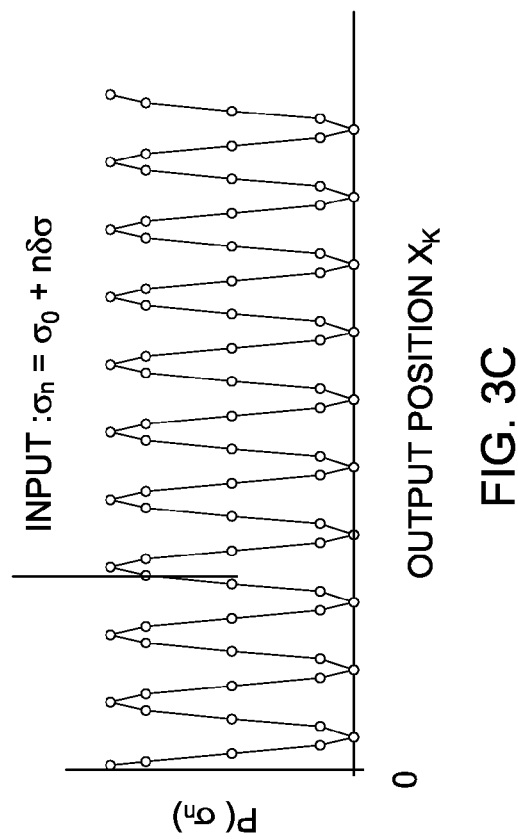

Similarly, the light signal of wavenumber $\sigma_n=\sigma_0+n\delta\sigma$ produces n spatial fringes, FIG. 3c, and so on—monochromatic inputs with different wavenumber result in different periodic patterns. Since a polychromatic signal can be represented by superposition of monochromatic constituents, a corresponding fringe pattern is formed by superposition of the respective periodic fringes, as illustrated in FIG. 3d. The parameter $\delta\sigma$ is inversely proportional to the maximum path delay $\Delta L_{N-1}(=(N-1)\Delta L)$, described as follows.

Wavenumbers that are equally spaced above and below the Littrow value produce the same fringe pattern. To avoid this ambiguity one needs to block one of the two redundant sets of wavenumbers. In the example of FIG. 3, the Littrow condition coincides with the minimum wavenumber of the spectral range and wavenumbers below $\sigma_0$ are assumed to be blocked by a bandpass filter. The spatial fringes can be regarded as single-sided interferograms from which the input spectra can be retrieved assuming the pattern is symmetric with respect to the point of origin (x=0). The device heterodynes the spatial interference pattern with respect to the Littrow wavenumber, hence the name spatial heterodyne spectrometer (SHS). The spatial heterodyning in this device has a similar meaning as in the bulk optics SHS instrument discussed above. The input spectrum and the output spatial distributions are related through an invertible linear transform which, as discussed above, is the Fourier cosine transform. It may also be observed that the above principle applies to any arrayed MZI device implementation provided that signal splitting, combining and loss mechanisms in the MZIs can be treated as spectrally independent.

For a monochromatic signal $s(\sigma)$ propagating in the asymmetrical MZI with path-length difference $\Delta L_k$, output power at the port $x_k$ is given by:

$$p(\sigma, x_k) = s(\sigma) 2\kappa^2 (1-\kappa^2)[\cos h(\alpha \Delta L_k) + \cos(\beta \Delta L_k)] e^{-\alpha \Delta L_k}, \quad (1)$$

where $\alpha$ and $\beta$ denote the amplitude attenuation coefficient and the propagation constant of the waveguide and $\kappa$ denotes the amplitude coupling coefficient of the directional (or MMI) coupler. For a lossless case ($\alpha=0$) with equal 50:50 splitting ($\kappa^2=\frac{1}{2}$), Eq. (1) reduces to:

$$p(\sigma, x_k) = \frac{s(\sigma)}{2}[1 + \cos(\beta \Delta L_k)]. \quad (2)$$

Considering the above ideal case, it is convenient to rewrite Eq. (1) as $$p(\sigma, x_k) = C_{dc} \frac{s(\sigma)}{2} [\cosh(\alpha \Delta L_k) + \cos(\beta \Delta L_k)], \quad (3)$$

where $C_{dc}$ is defined by:

$$C_{dc} = 4\kappa^2 (1-\kappa^2) e^{-\alpha \Delta L_k}. \quad (4)$$

For the light spectrum consisting of discrete monochromatic constituents, the output power can be represented as a sum of the contributing signals each corresponding to a specific monochromatic input. For sources with a continuous spectral distribution, it is convenient to introduce the spectral power $s(\sigma)d\sigma$, which is the power within a small range of optical frequencies from $\sigma_0$ to $\sigma_0 + \delta\alpha$. From the superposition principle, the interferometric expressions for the output powers corresponding to Eq. (3) are given by the following integral equations $$\int_0^\infty p(\sigma, x_k) d\sigma = \quad (5)$$
$$\frac{C_{dc}}{2} \cosh(\alpha \Delta L_k) \int_0^\infty s(\sigma) d\sigma + \frac{C_{dc}}{2} \int_0^\infty s(\sigma) \cos(\beta \Delta L_k) d\sigma,$$

where $\alpha$ and $C_{dc}$ are assumed to be wavelength independent in the spectral range of interest. The above equation is rewritten as $$P(x_k) = \frac{C_{dc}}{2} \cosh(\alpha \Delta L_k) S + \frac{C_{dc}}{2} \int_0^\infty s(\sigma) \cos(2\pi n_c \sigma \Delta L_k) d\sigma, \quad (6)$$

where $n_c$ is an effective index of the waveguide, $$P(x_k) = \int_0^\infty p(\sigma, x_k) d\sigma, \quad (7)$$

and $$S = \int_0^\infty s(\sigma) d\sigma. \quad (8)$$

Eq. (6) can be further simplified by introducing the following interference term $F(x_k)$ as:

$$\int_0^\infty s(\sigma) \cos(2\pi \sigma n_c \Delta L_k) d\sigma = \frac{1}{C_{dc}} [2P(x_k) - C_{dc} \cosh(\alpha \Delta L_k) S] \triangleq F(x_k). \quad (9)$$

For a uniform illumination of the multi-aperture input, the input modal power $P_{in}$ is constant for all the input waveguides. For a non-uniform illumination, $P_{in}(x_k)$ can be measured directly with a probing waveguide or, alternatively, one can use the complementary output powers of the MZI to calculate $P_{in}(x_k)$. For a non-uniform illumination, $F(x_k)$ is replaced by $F(x_k)/P_{in}(x_k)$ and therefore Eq. (9) is rewritten as $$\int_0^\infty s(\sigma) \cos(2\pi \sigma n_c \Delta L_k) d\sigma = \frac{1}{C_{dc}} \left[ 2 \frac{P(x_k)}{P_{in}(x_k)} - C_{dc} \cosh(\alpha \Delta L_k) S \right] \quad (10)$$
$$\triangleq F(x_k).$$

The interference term $F(x_k)$ is a modified spatial interferogram which in normal device operation will be created in the signal processing step based on measured powers. The spatial coordinate $x_k$ is measured in units of $\Delta L_k$, so we set it equal to the optical path difference $x_k = n_c \Delta L_k$ and call it the modified delay. Consequently, on a physical waveguide layout, the discrete output ports need not be uniformly distributed as long as the MZI delay increment is constant and the output port readings are digitally processed in the same increasing order.

One can formally demonstrate an analogy to standard Fourier-transform spectrometry and consider very small delay increments and a large number of MZIs, thus reaching a continuous limit in the formulas. From Eqs. (5)-(10) the continuous limit interferogram and the input spectral power $S(\sigma)$ are related through the Fourier cosine transform $$F(x) = \int_0^\infty s(\sigma) \cos(2\pi\sigma x) d\sigma = \int_{-\infty}^\infty s(\overline{\sigma}) \cos(2\pi \overline{\sigma} x) d\overline{\sigma}. \quad (11)$$

In the last equation we introduced the shifted wavenumber variable $\overline{\sigma} = \sigma - \sigma_0 (= n\delta\sigma)$. Since we are interested in a limited spectral range $2\Delta\sigma = \sigma_{max} - \sigma_0$ outside which the spectral power vanishes, one may extend the lower integration limit in the last equation to infinity. By adding $S = \int_{-\infty}^\infty s(\overline{\sigma}) d\overline{\sigma}$ to both side of the above equation, Eq. (11) can be rewritten as:

$$I_T(x) \triangleq \frac{1}{2}[F(x) + S] \quad (12)$$
$$= \frac{1}{C_{dc}} \frac{P(x)}{P_{in}(x)} + \frac{S}{2}\left[1 - \cosh\left(\alpha \frac{x}{n_c}\right)\right]$$
$$= \int_0^{2\Delta\sigma} s(\overline{\sigma}) \frac{1}{2}[1 + \cos(2\pi\overline{\sigma}x)] d\overline{\sigma},$$

where Eq. (10) and the relation $x_k = n_c \Delta L_k$ have been used. An identical expression to Eq. (12) is obtained for an interferogram produced at the output of an ideal two-beam free-space interferometer with a variable path delay x irradiated by the power spectrum $s(\sigma)$.

In practical waveguide device implementations, the spatial interferogram $I_T(x)$ is discretized at $N^*$ equally spaced delay values $x_k(0 \leq x_k \leq \Lambda)$ corresponding to the outputs of different MZIs, where $N^* = 2N$. Though the spatial interferogram for the higher wavenumber $\sigma_k(k=N \sim N^*-1)$ are blocked by the bandpass filter in the practical applications, fictitious interferogram for the higher wavenumber $\sigma_k(k=N \sim N^*-1)$ should be taken into account in the theoretical treatments. The maximum delay is given by $\Lambda=n_c\Delta L_{N^*}=n_c N^*\Delta L$. The wavenumber resolution $\delta\sigma$ of the spectrometer is determined by the maximum interferometric delay $\Lambda$. To resolve two monochromatic signals with wavenumbers $\sigma$ and $\sigma+\Delta\sigma$ it is required that the respective interferograms differ by one fringe, that is, an interferogram phase change of $2\pi$:

$$\Delta\phi = 2\pi(\sigma+\delta\sigma)\Lambda - 2\pi\sigma\Lambda = 2\pi \tag{13}$$

thus $$\delta\sigma\Lambda = \delta\sigma n_c \Delta L_{N^*} = 1. \tag{14}$$

This can also be represented using the wavelength resolution $\delta\lambda$ near the central wavelength of the range $\lambda_0$, where $\delta\lambda \ll \lambda_0$. A useful expression for $\Delta L_N$ can be obtained in terms of the resolving power $R=\lambda_0/\delta\lambda$ which is often used in grating spectroscopic devices:

$$\delta\sigma = \frac{1}{\lambda_0} - \frac{1}{\lambda_0+\delta\lambda} \approx \frac{\delta\lambda}{\lambda_0^2} = \frac{1}{R\lambda_0}. \tag{15}$$

The maximum path delay is thus:

$$\Delta L_{N^*} = \frac{1}{\delta\sigma n_c} = R\frac{\lambda_0}{n_c} = \frac{\lambda_0^2}{\delta\lambda n_c}. \tag{16}$$

The number of discrete points N in the interferogram, that is the number of MZIs in the array, is determined from the Fourier sampling theorem. According to the theorem, for the spectral power non-vanishing only within the range $2\Delta\sigma$, the spectrum $s(\sigma)$ is fully specified by sampling the interferogram at spectral intervals not exceeding $(2\Delta\sigma)^1$. In other words, the minimum number of sampling points may be:

$$N^* = \Lambda 2\Delta\sigma = \frac{2\Delta\sigma}{\delta\sigma} = \frac{2\Delta\lambda}{\delta\lambda}, \tag{17}$$

where $\Delta\lambda$ is the wavelength spectral range of the spectrometer. For example, an arrayed MZI spectrometer operating over the $\Delta\lambda=7.68$ nm wavelength range at 0.06 nm resolution requires 128 MZIs. Since each MZI couples to a separate input waveguide, in this example the optical throughput is increased by a factor of 128 compared to a single input device.

By using Eqs. (14)-(17), Eq. (12) can be expressed in the discrete form as:

$$I_T(x) = \frac{1}{\Lambda}\sum_{n=0}^{N^*} \eta_n \frac{s_n}{2}\left[1+\cos\left(\frac{2\pi x}{d_n}\right)\right], \tag{18}$$

where $s_n = s(n\delta\sigma)$, $d_n = \Lambda/n$, and:

$$\eta_n = \begin{cases} 1/2 & \dots n=0 \\ 1 & \dots n=1, 2, \sim, N^*-1 \\ 1/2 & \dots n=N^* \end{cases} \tag{19}$$

Based on the discrete Fourier cosine transform, the input spectrum $s_n$ can be then calculated from the measured output power $I_T(x)$ as:

$$s_n = \frac{4}{\eta_n}\int_0^\Lambda I_T(x)\cdot\cos\left(\frac{2\pi x}{d_n}\right)dx \tag{20}$$

$(n = 1, 2, \dots, N)$, $$s_0 = 2\Lambda S - \left(2\sum_{n=1}^{N-1} s_n + s_N\right), \tag{21}$$

where we used the relation $I_T(0)=\int_0^{2\Delta\sigma} s(\bar{\sigma})d\bar{\sigma}=S$ which is obtained from Eqs. (8) and (12). Eq. (20) is rewritten in the discrete form as:

$$s_n = \frac{4\Lambda}{N^*\eta_n}\left[S + \sum_{k=1}^{N^*-1} I_T(x_k)\cos\left(\frac{2\pi x_k}{d_n}\right)\right] (n = 1, 2, \dots, N), \tag{22}$$

where $I_T(x_k)$ for $k=N\sim N^*-1$ is assumed to be $I_T(\Lambda-x_k)$ based on the cosine Fourier Transform theory, which is confirmed by replacing $x_k$ with $\Lambda-x_k$ in Eq. (18).

By analogy to continuous Fourier-transform spectrometry, the finite summation in Eq. (22) corresponds to a step-like cut-off (truncation) in the spatial interferogram distribution. Such truncation causes oscillatory features (ripple) in the retrieved spectrum. The ripple can be reduced by apodization. For this purpose, we apodize the interferogram by using the weighting function W(x), thus obtaining the following spectrum retrieval formula:

$$s_n = \frac{4\Lambda}{N^*\eta_n}\left[S + \sum_{k=1}^{N^*-1} W(x_k)I_T(x_k)\cos\left(\frac{2\pi x_k}{d_n}\right)\right] \tag{23}$$

$(n = 1, 2, \dots, N)$, where the standard form of the weighting function is $W(x_k)=[1-(k/N^*)^{2M}]$ (M: integer).

The discrete Fourier transform formulas Eqs. (21), (23) with the criteria for maximum delay Eq. (16) and the number of sampling points (interferometers) Eq. (17) constitute a closed model of the arrayed Mach-Zehnder spectrometer. The measurement required to be physically performed by the interferometer is that of the optical power values at the multiple outputs of the array. Performance details of various waveguide components are contained in coupling and loss coefficients. These can be measured independently and their values introduced into the calculations as constant device parameters. Deviations from the ideal design will appear as systematic errors in the interferograms. Once the waveguide device has been fabricated and characterized, the errors can be eliminated by a calibration procedure, for example using a look-up table incorporated in the retrieval algorithm.

The layout of the waveguide array is constrained by the number N of Mach-Zehnder structures and the required maximum delay $\Delta L_N$, which determines their size.

Figure 4A:
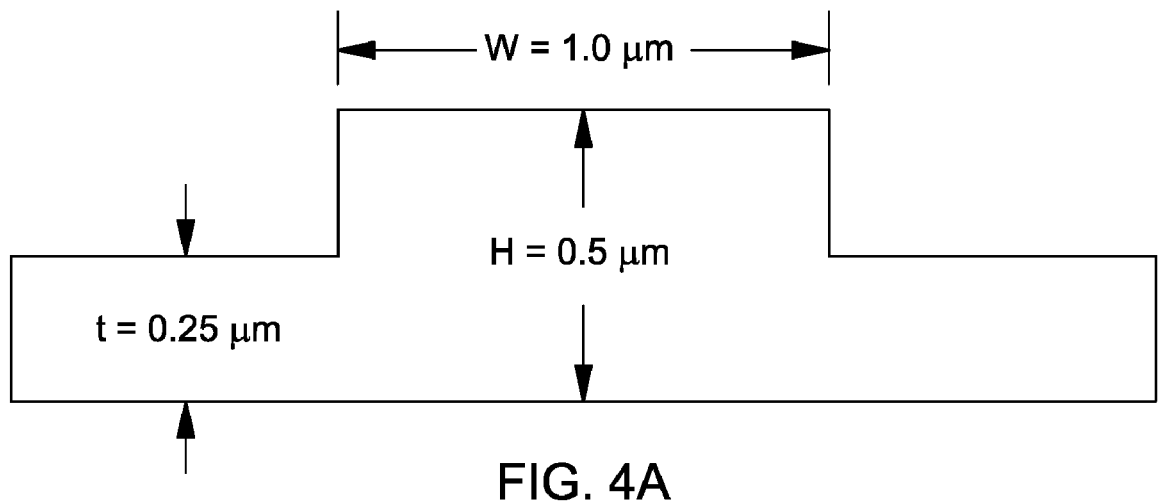
FIG. 4a depicts a configuration of Si-rib waveguides and FIG. 4b depicts its electric field distribution.
Figure 4B:
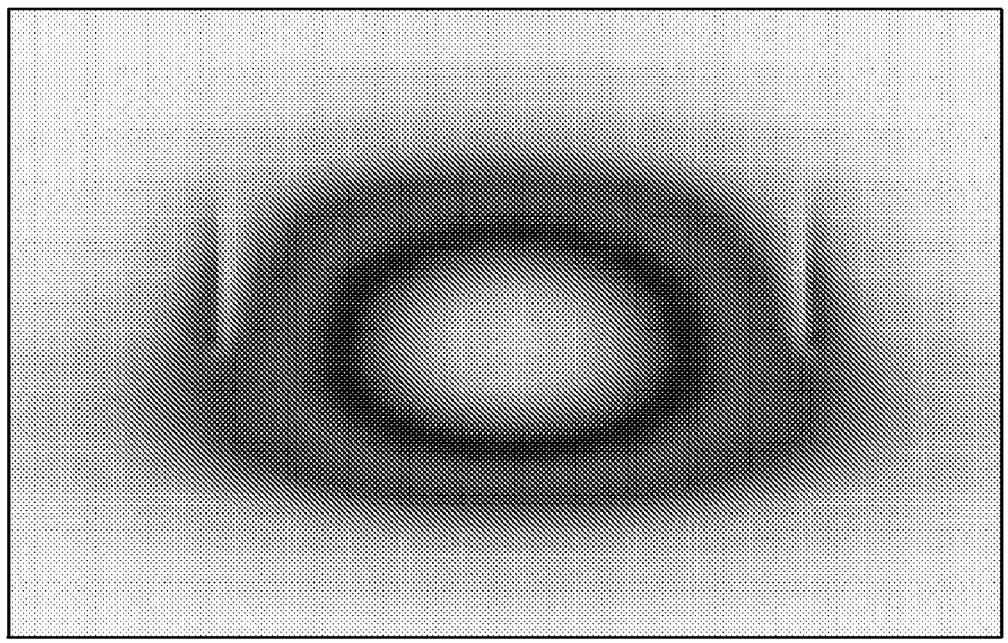

These parameters are listed in Table 1 for the wavelength range $\Delta\lambda=4.1$ nm and selected values of resolution $\delta\lambda$, assuming representative values of the effective index $n_c=1.45485$ for silica waveguide, 1.732268 for silicon slotted waveguide, 1.534457 for Si3N4 slotted waveguide, 2.501636 for silicon sub-µm wire waveguide, and 3.200292 for silicon-rib waveguide (shown in FIGS. 4a-b), respectively. Comparing for the same resolution requirement, $\Delta L_N$ is smaller for silicon-rib waveguides and thus requires smaller MZIs because of the larger effective index $n_c$.

TABLE 1

Number of MZIs and the maximum delay for four exemplary waveguide technologies

| Resolution δλ (nm) | Number of MZIs, N | Silica WG ΔL$_N$ (mm) | Si-slot WG ΔL$_N$ (mm) | Si$_3$N$_4$-slot ΔL$_N$ (mm) | Si-wire WG ΔL$_N$ (mm) | Si-rib WG ΔL$_N$ (mm) |
|---|---|---|---|---|---|---|
| 0.128 | 64 | 12.96 | 10.88 | 12.28 | 7.53 | 5.89 |
| 0.064 | 128 | 25.92 | 21.76 | 24.57 | 15.07 | 11.78 |
| 0.032 | 256 | 51.83 | 43.52 | 49.13 | 30.14 | 23.56 |
| 0.016 | 512 | 103.66 | 87.04 | 98.27 | 60.27 | 47.12 |

Figure 5:
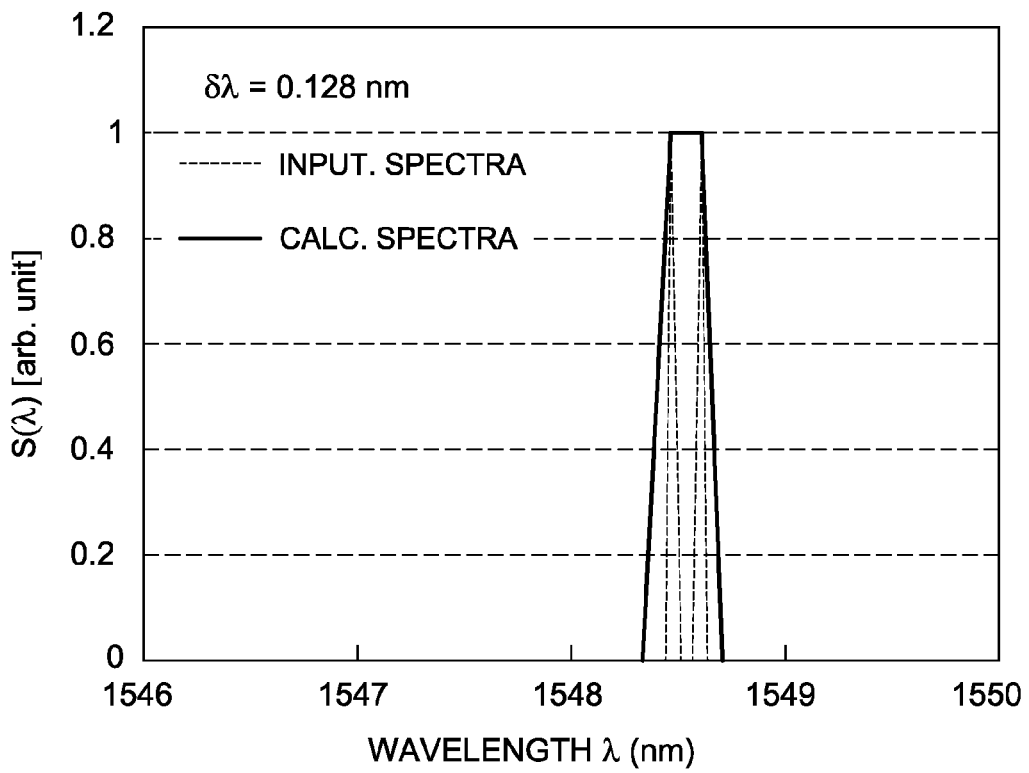
FIG. 5 depicts the calculated spectra of a test doublet at a resolution 0.128 nm.
Figure 6:
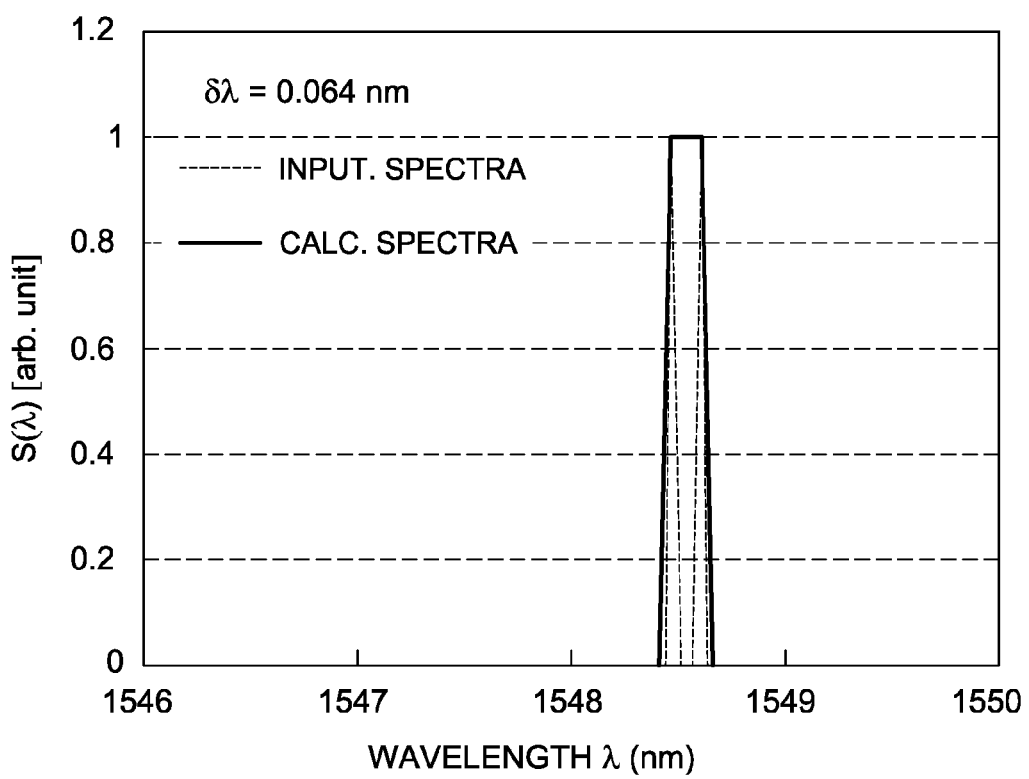
FIG. 6 depicts the calculated spectra of a test doublet at a resolution of 0.064 nm.

The following simulation results are presented for silica waveguides. A fundamental property of any spectrometer is its ability to resolve spectral lines. Therefore, it is convenient to use an emission doublet as a test spectrum. As shown in FIGS. 5 and 6, the input doublet (dashed line) consists of two sharp emission lines (FWHM=0.03 nm) separated by 0.128 nm in the spectral range window of 4.1 nm. The wavelength range window is the Fourier calculation domain. The spectrum is calculated from the distribution of the discrete fringes of waveguide output power with the help of a spatial Fourier transformation (Eq. 23). FIG. 5 shows the calculated doublet spectra with resolution δλ=0.128 nm (N=64, ΔL$_N$=12.96 mm). The spectral lines of the doublet are not well-resolved since the resolution δλ=0.128 nm is not small enough to resolve the doublet separation of 0.128 nm. Referring to Table 1, design for better resolution implies a larger number of MZIs and increased maximum delay ΔL$_N$. This is illustrated in FIG. 6, where the doublet spectra is retrieved using a spectrometer with resolution δλ=0.064 nm (N=128, ΔL$_N$=25.92 mm). The doublet is now fully resolved.

Figure 7:
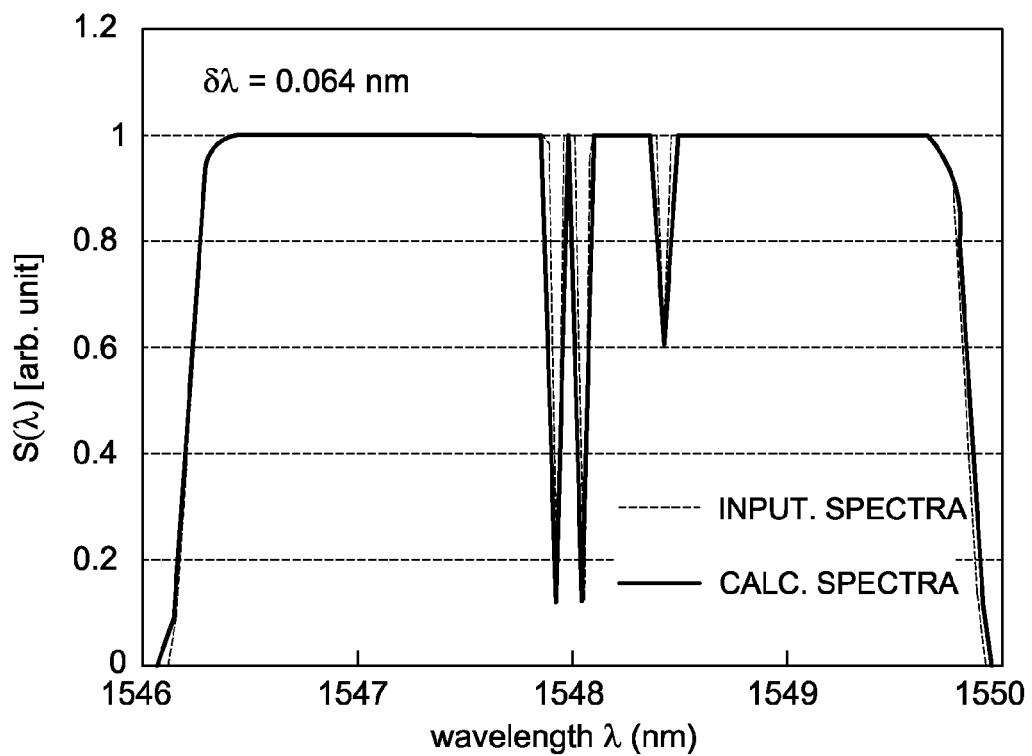
FIG. 7 depicts a test absorption spectra.
Figure 8:
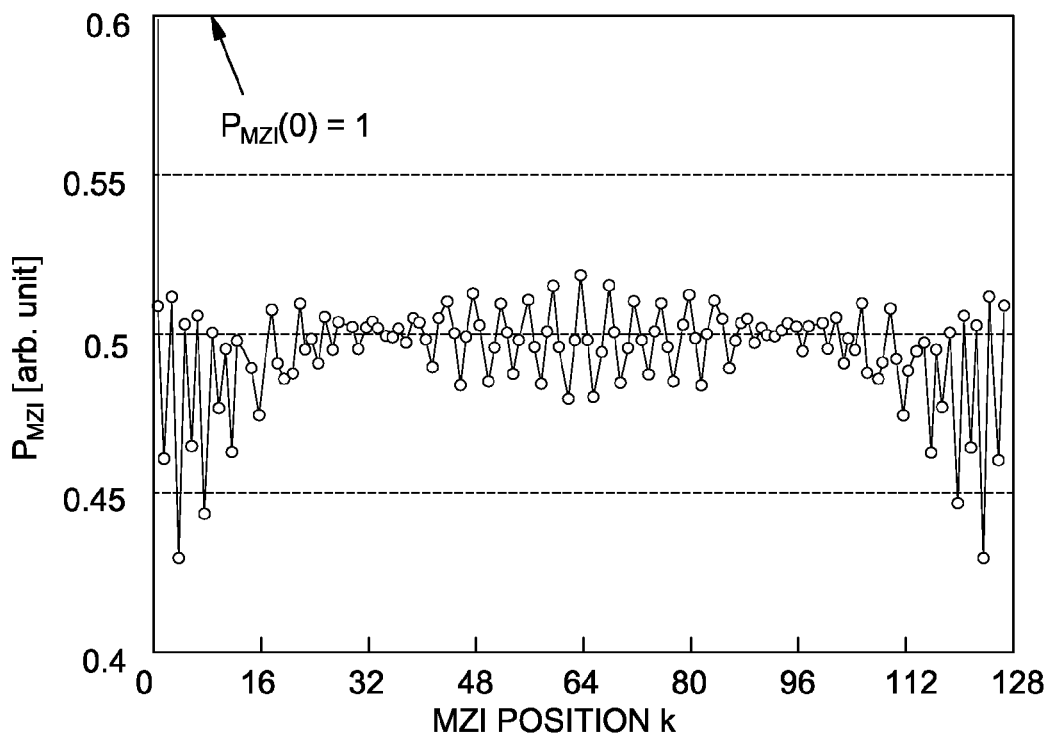
FIG. 8 depicts the output power of 128 MZIs.

Next an example of absorption spectra consisting of a series of sharp absorption lines is considered. Normally, the absorption lines are present on a bright background radiation. In the simulations, a top-hat super-Gaussian passband filter is assumed to attenuate the background radiation outside the wavelength range Δλ. FIG. 7 shows the absorption spectra simulated with spectrometer resolution δλ=0.064 nm in the wavelength range Δλ=4.1 nm. FIG. 8 is the distribution of the MZI output power (Eq. (18)) for 128 MZIs. It is shown that the fine structure of the absorption lines is clearly resolved.

Assuming that the appropriate waveguides are available, arrayed MZIs can be used for spectrometry and sensing beyond the near-infrared and visible spectral regions. SiO$_2$ and Si$_3$N$_4$ waveguides are attractive in the visible to ultraviolet region. In the mid-infrared region, waveguides have been developed for nulling interferometry, where different types of waveguide technologies have been studied for application in the 6-20 μm range of a space project. These include chalcogenide glass, ZnSe/ZnS, and metallic hollow waveguides. Silicon technology may also be extended to the long-wave infrared region of 1.55-100 μm by using Si rib membrane, germanium-on-silicon, and Si-based hollow-core waveguides.

Figure 9:
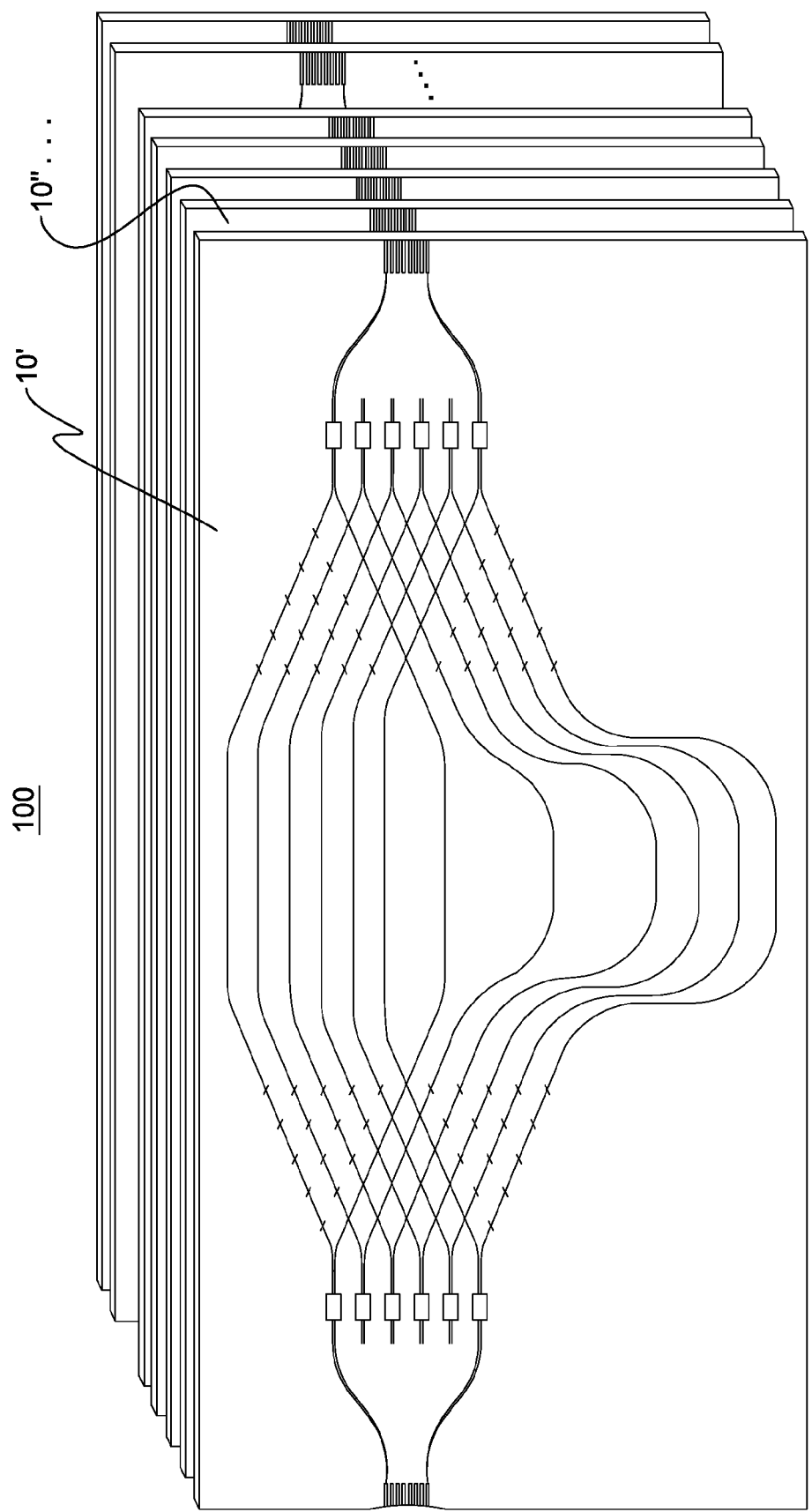
FIG. 9 depicts a 3-dimensional planar lightwave Fourier-transform spectrometer with interweaved MZIs, in accordance with the present invention.

3-Dimensional Embodiment:

In accordance with an improved embodiment of the present invention, FIG. 9 depicts a 3-dimensional planar lightwave Fourier-transform spectrometer 100 with an interweaved MZI configuration. Several planar lightwave circuits (PLCs) 10' 10" . . . , such as those described above in connection with FIG. 2, are stacked on top of each other to construct a 3-dimensional spectrometer. A thin layer of adhesive may be used between PLCs.

Figure 10:
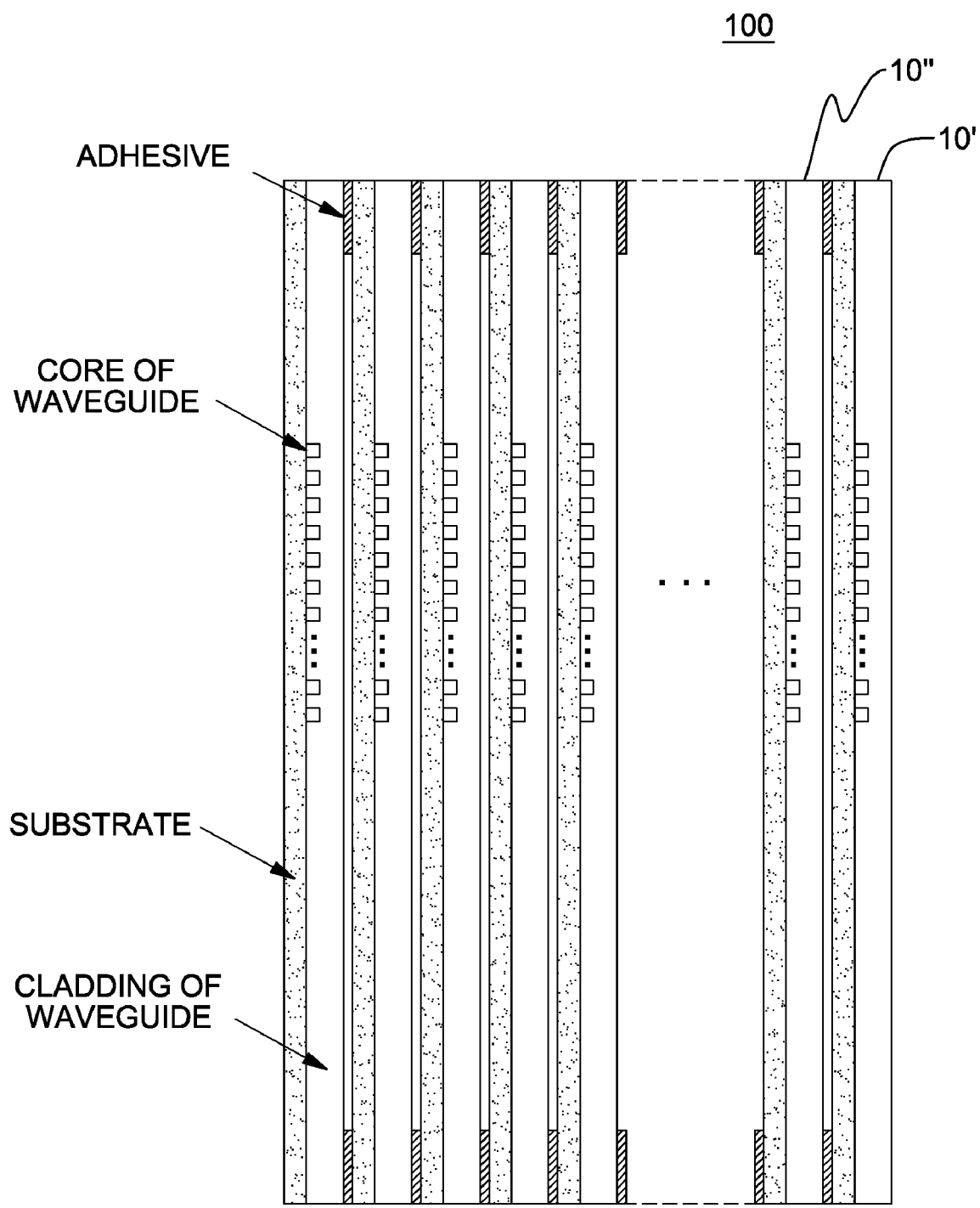
FIG. 10 depicts a left-side view of the 3-dimensional planar lightwave Fourier-transform spectrometer of FIG. 9, in accordance with the present invention.

FIG. 10 shows the left-side (light-input side) view of the 3-dimensional planar lightwave Fourier-transform spectrometer of FIG. 9. The substrates of the PLC may be thinned by polishing from an original thickness of 500~1000 μm to several tens of microns. Core and cladding thickness may be typically 6 μm and 20 μM, respectively. Right-side (light-output side) view of the 3-dimensional planar lightwave Fourier-transform spectrometer is quite similar to that of the left-side view. A 2-dimensional detector array may be attached to the end-face of the output waveguide array region. A 3-dimensional planar lightwave Fourier-transform spectrometer as disclosed enables to measurement of a 2-dimensional light spectrum distribution.

Figure 11:
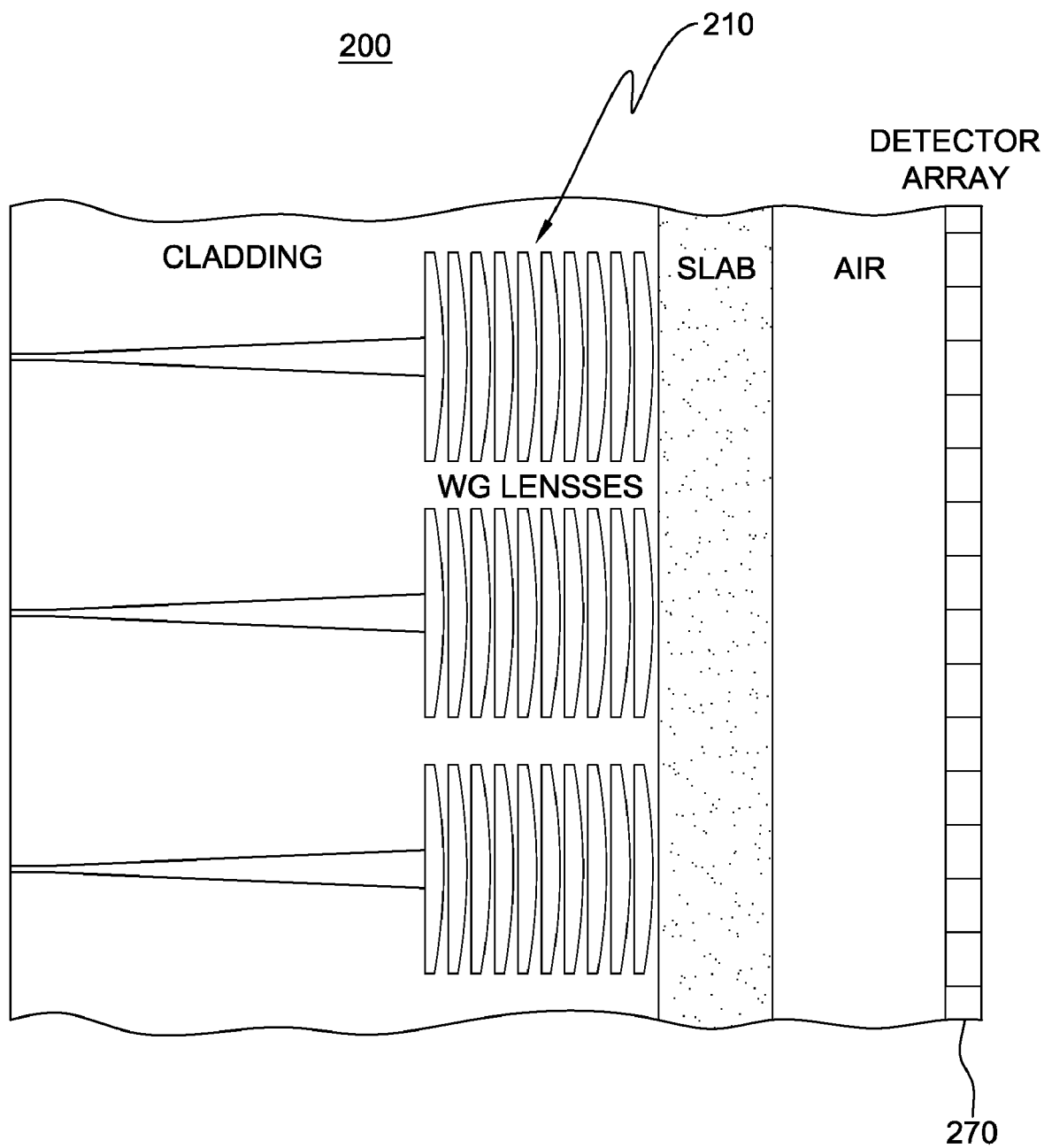
FIG. 11 depicts a waveguide lens array to collimate the output beams, in accordance with the present invention.

Collimating Lens Embodiment:

Typically, the interference signals of the asymmetrical MZIs are collected by the output waveguides and directly coupled to the detector array. However, the detector chip may be located about 3 millimeters behind the front glass window of the TO (transistor outline) package in one embodiment. A micro-lens can be used to collimate the multiple output beams. However, alignment tolerances to the micro-lens becomes very tight (less than one micron) since the focal length is very small. In accordance with the present invention, disclosed herein is an improved spectrometer 200 with waveguide lens array 210 to collimate the output beams, as depicted in FIG. 11. This waveguide lens array can be formed on the same substrate, and using the same process used for forming the other waveguides, therefore, the positional accuracy can be very high.

Figure 12:
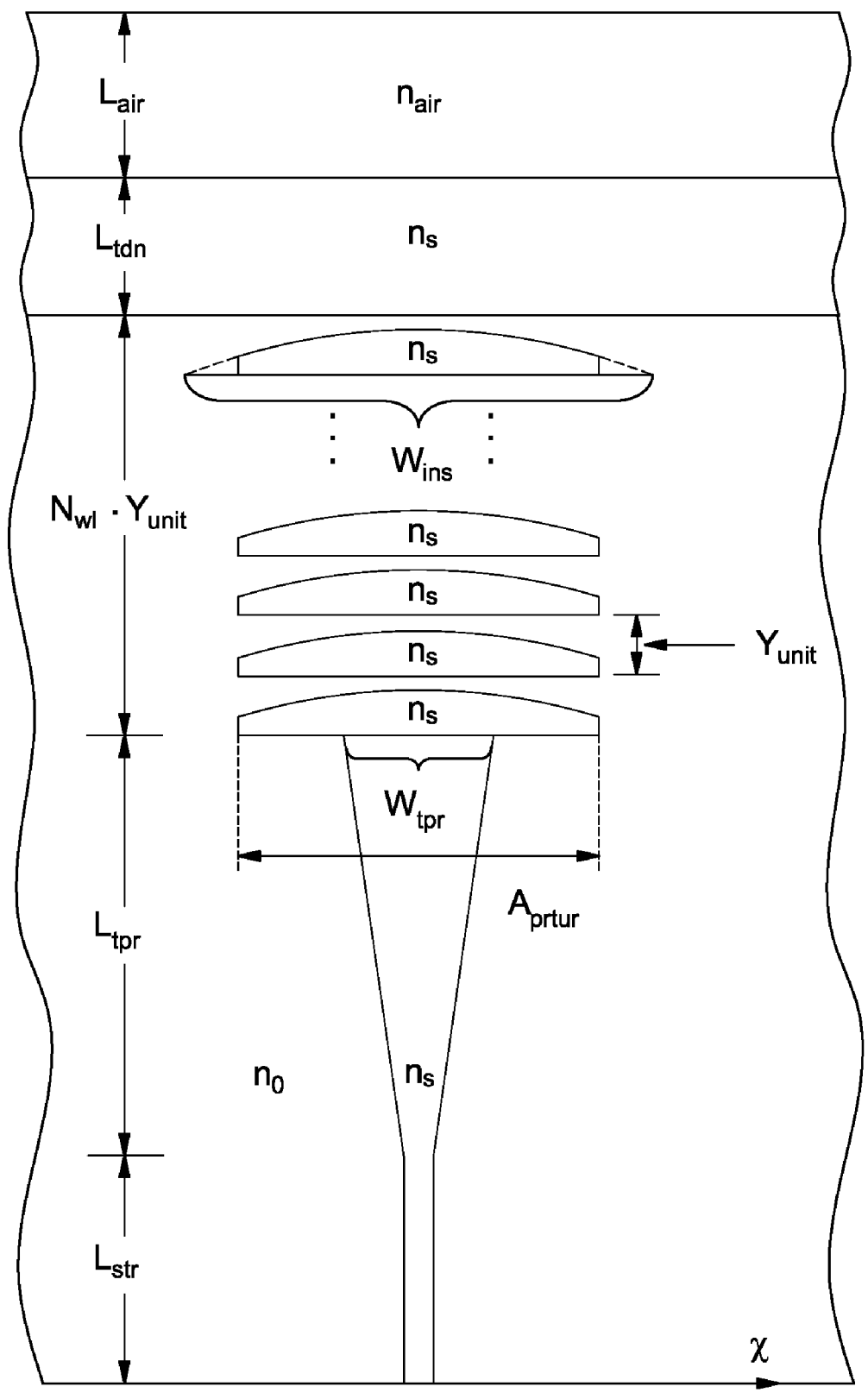
FIG. 12 depicts a schematic of a waveguide lens and an exemplary parameter definition.

FIG. 12 is a detailed schematic of a single waveguide lens array of FIG. 10, with exemplary parameters defined as follows; L$_{str}$ denotes straight waveguide length with the normal core width, L$_{tpr}$ and W$_{tpr}$ denote taper waveguide length and width, N$_{wl}$ denotes number of the waveguide lens, L$_{tdn}$ denotes length of the core slab region at the chip endface (thickness of the glass window of the TO package is included in L$_{tdn}$), and L$_{air}$ denotes the recess distance from the front glass window to the detector chip. W$_{lns}$ lns denotes the original lens width and A$_{prtur}$ denotes the truncated lens width; n$_s$, n$_0$, n$_{air}$ denote refractive indices of the core, cladding and air, respectively. Y$_{unit}$ is the thickness of the single lens including a several micron gap between the lenses. Therefore, the total thickness of the waveguide lens is N$_{wl}$×Y$_{unit}$. Exemplary curvature of the lens is expressed by the parabolic function as:

$$\eta = \frac{\left(\frac{W_{lns}}{2}\right)^2 - \xi^2}{2f(n_s - n_0)}, \tag{24}$$

where f denotes the focal length and the local coordinates ξ and η originate the bottom-center of the respective lenses The above parameters can be optimized by numerical simulation to achieve a beam collimation over several millimeter lengths.

Figure 13:
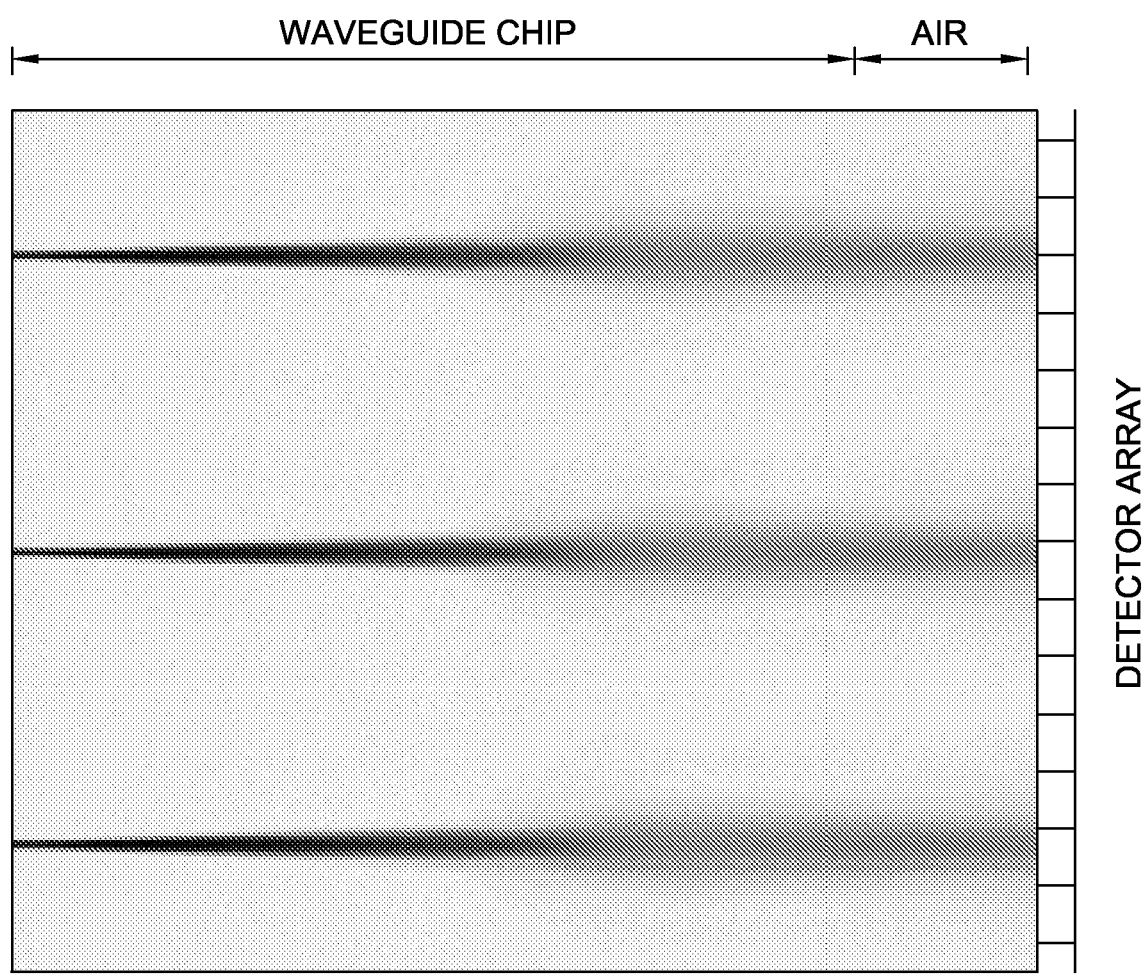
FIG. 13 depicts an exemplary beam collimation in the optimized waveguide lens.

FIG. 13 shows the resultant collimated beam propagation using exemplary optimized waveguide lens parameters.

Exemplary parameters used are $n_s=1.457454$, $n_0=1.444257$, $n_{air}=1.0$, $L_{str}=1$ mm, $L_{tdn}=2$ mm, and $L_{air}=3$ mm. Exemplary parameters providing quality beam collimation are as follows: $L_{tpr}=6.6$ mm, $W_{tpr}=50$ µm, $f=10.5$ mm, $N_{wl}=10$, $W_{lns}=650$ µm, $A_{prtur}=250$ µm, $Y_{unit}=383.6$ µm, respectively.

The disclosed waveguide lens can collimate the beam in the horizontal direction. Therefore, waveguide lens is applicable for single spectrometer configuration as shown in FIG. 2. For the 3-dimensional spectrometer configuration, a cylindrical lens can be attached at the endface of the chip.

Waveguide Phase Correction Embodiment:

Refractive index fluctuations can cause degradation in spectrometer performance. FIGS. 14a-d illustrate this problem, and the results of a disclosed solution (FIG. 14d) in accordance with the present invention, for a spectrometer with $\Delta L=162$ µm.

Figure 14A:
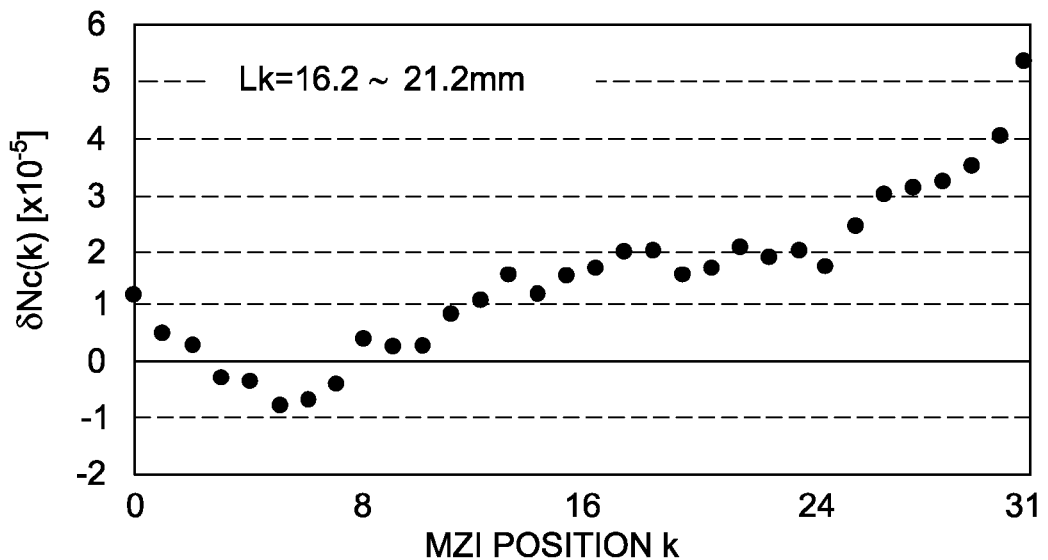
FIG. 14 a-d depict the correction of phase errors in accordance with the present invention, as follows: (a) measured effective-index fluctuation in the MZI array, (b) an original signal spectrum coupled into the spectrometer, (c) a retrieved signal spectrum without correction, and (d) a spectrum corrected in accordance with the present invention.
Figure 14B:
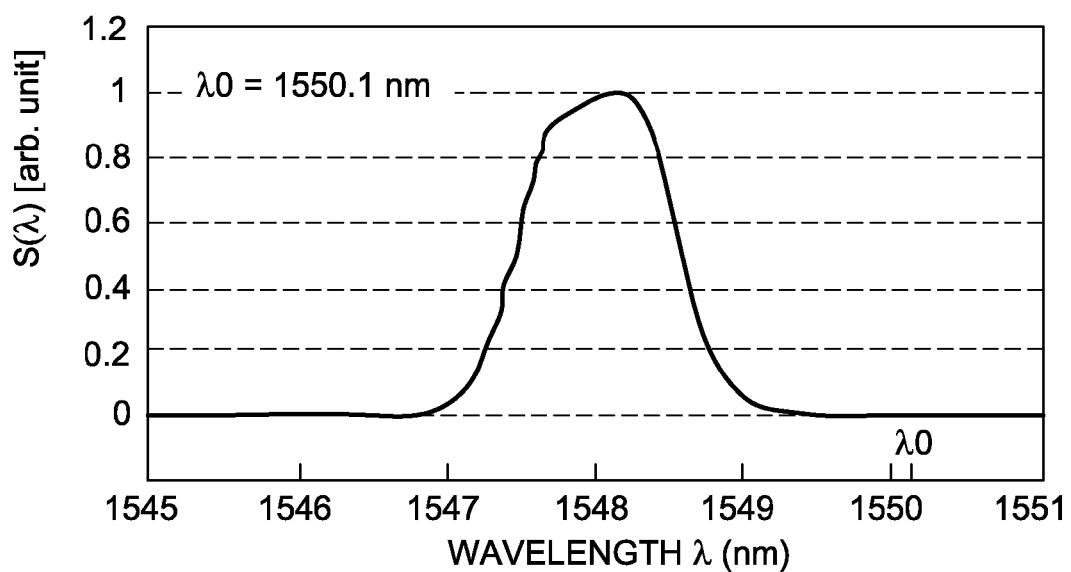
Figure 14C:
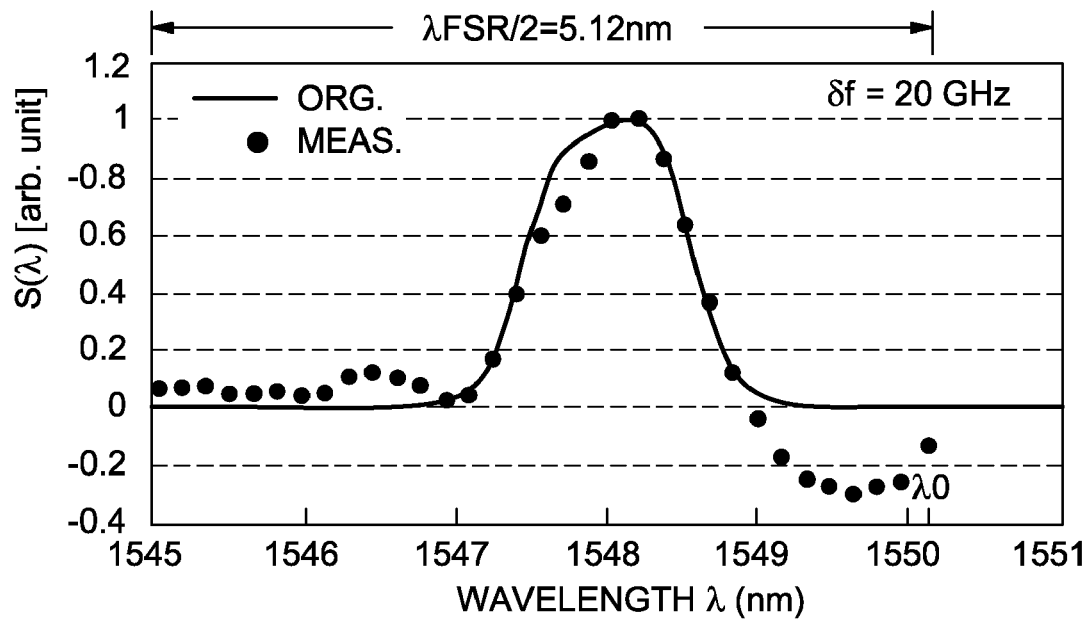

FIG. 14a shows a measured effective-index fluctuation across the spectrometer. FIG. 14b shows an exemplary input waveform used for additional measurements. FIG. 14c shows both an expected output waveform by simulation (solid line) and measured data (dots) by using Eq. (23) without taking into account the measured effective-index fluctuations. Generally good correlation is shown between expected and measured data, except for discrepancies in the shorter and longer wavelength regions.

Figure 15A:
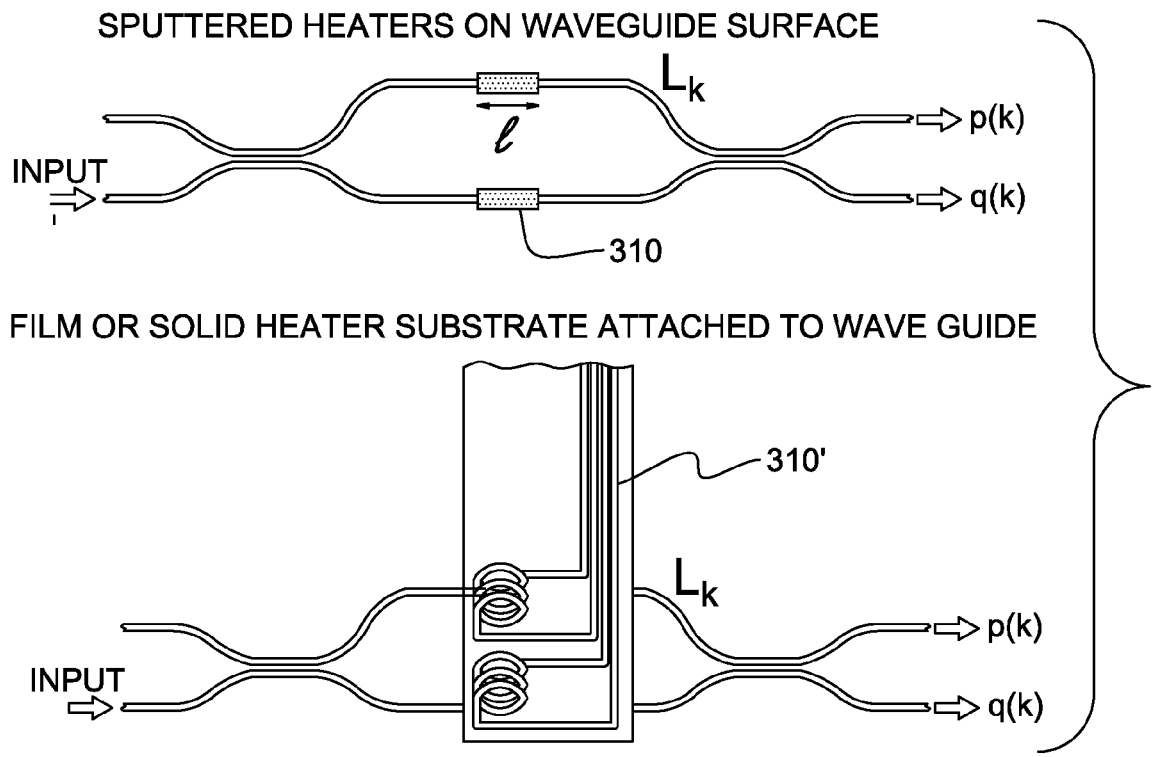
FIG. 15a depicts exemplary heating affixed to the waveguides in accordance with the present invention.
Figure 15B:
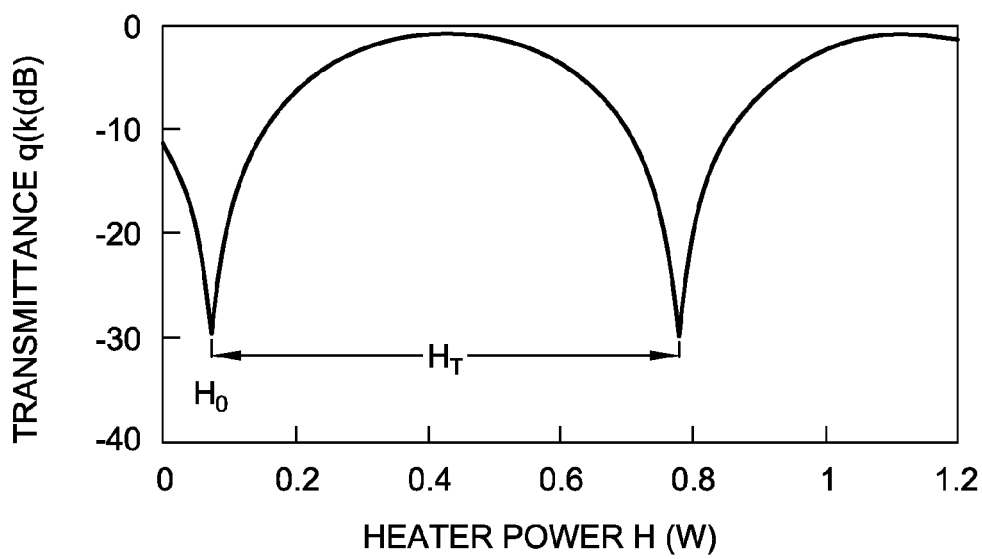
FIG. 15b depicts through port response vs. heater power.
Figure 16:
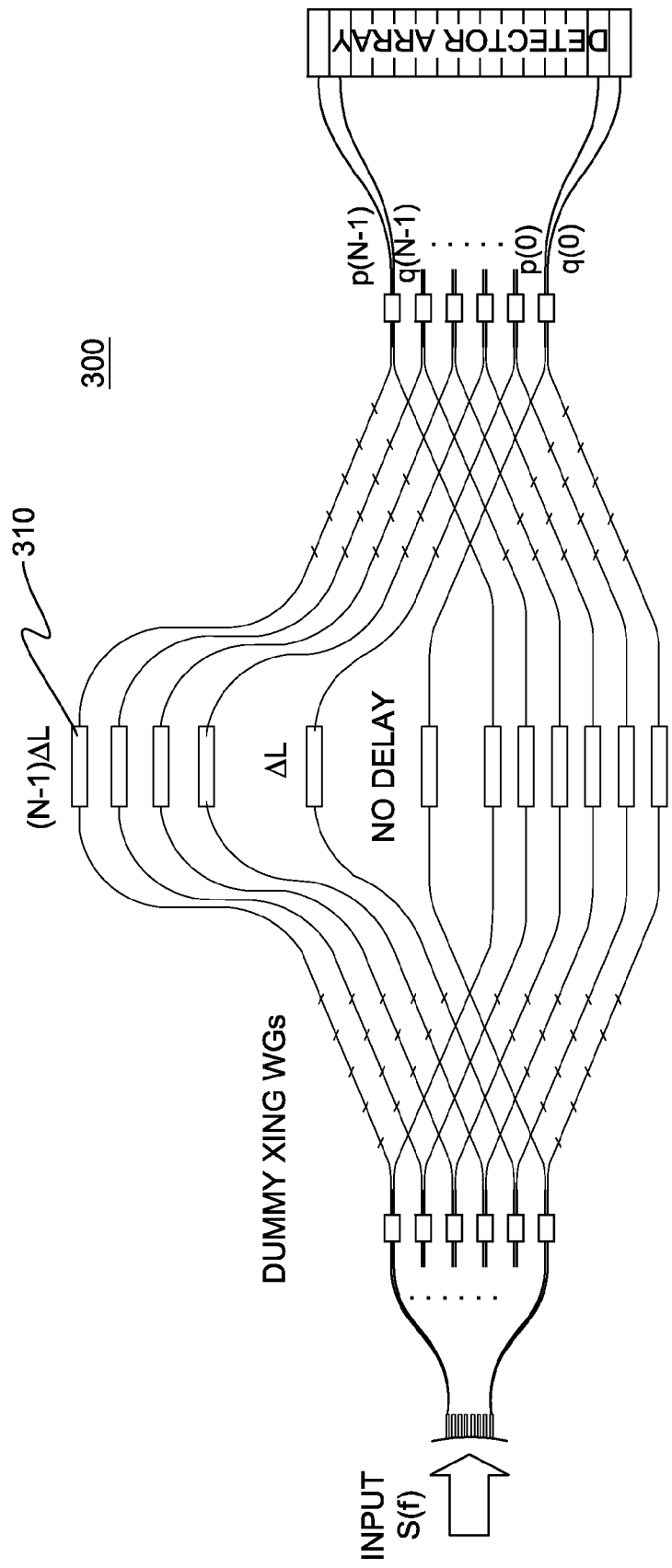
FIG. 16 depicts an entire spectrometer with exemplary heaters, in accordance with the present invention.

In accordance with the present invention and with reference to FIGS. 15-16, an improved spectrometer 300 can be provided with heating elements 310 or 310' applied to the MZI waveguides to correct these phase errors. FIG. 15a shows two possible embodiments of such heaters, in the form of sputtered heaters 310 formed integral with the waveguide, or e.g., film or solid "glass pipe" heaters 310' separately affixed to the waveguides.

Film-type heaters as well as substrate based heaters can be used. An external substrate based heater (either thin film heater onto substrate, or heater affixed onto substrate) can be formed as a separate assembly, and this entire assembly can be attached to the PLC surface. Exemplary chip size including input and output fan out regions can be 43×25 mm².

FIG. 16 also shows an embodiment with 2 waveguides from the output-side coupler into two separate detectors. These represent both cross port and through port outputs $p(k)$ and $q(k)$ in the k-th ($k=0\sim N-1$) MZI, which can be processed so that the spatial nonuniformity of the input light distribution can be corrected. For a signal $s(f)$ passing through the k-th MZI, a normalized cross port output is given by assuming negligible waveguide loss as:

$$P(k) = \frac{p(k)}{p(k)+q(k)} = \frac{1}{S}\int_{f_0}^{f_0+FSR} s(f)\frac{[1+\cos(\beta k \Delta L)]}{2}df \quad (25)$$

$(k=0\sim N-1),$ where $\beta$ is a propagation constant, FSR is a free spectral range determined by $\Delta L$ and $S=\int_{f_0}^{f_0+FSR} s(f)df$. $f_0$ is denoted as the Littrow frequency at which phase delays in different MZIs become integer multiples of $2\pi (\beta(f_0)\Delta L=2m\pi)$. Since MZI response repeats periodically with FSR, one needs to block the unnecessary spectral range by a bandpass filter. Based on the discrete cosine Fourier transform, the input spectrum $s(f_n)$ ($f_n=f_0+nFSR/\hat{N}$, where $\hat{N}=2N=64$) can be calculated from the measured output power $P(k)$ as:

$$s(f_n) = A\sum_{k=0}^{\hat{N}-1} P(k)\cos\left(2\pi\frac{nk}{\hat{N}}\right) \quad (n=0\sim N-1). \quad (26)$$

where A is a constant and $P(k)$ for $n=N\sim\hat{N}-1$ is assumed to be $P(\hat{N}-k)$. Since MZI responses for the signal in the upper half of FSR, $s(f_n)$ ($n=N\sim\hat{N}-1$), have identical spatial fringe representation to those of the signal in the lower half, only the lower half of the signal spectrum can be measured. Resolution of the spectrometer is given by $\delta f=c/(\hat{N}n_c\Delta L)=20$ GHz, where $n_c$ and c are effective index and light velocity. Phase errors caused by effective-index fluctuations in the MZI array deteriorate the accuracy in the retrieved signal by Eq. (26). Phase error $\delta\phi_k$ in the k-th MZI is expressed as $\delta\phi_k=(2\pi/\lambda_0)\delta n_c(k)L_k$, where $\delta n_c(k)$ and $L_k$ denote effective-index fluctuation and MZI arm length as shown in FIG. 15a. A heater with length l can be placed from outside of the chip on either one of the MZI arms to measure $\delta\phi_k$. The through port transmittance $q(k)$ under thermo-optic effect is given by:

$$q(k) = \frac{1}{2}\left\{1-\cos\frac{2\pi}{\lambda_0}[\alpha H l - \delta n_c(k)L_k]\right\}. \quad (27)$$

where H is a heater power applied to the phase shifter, $\alpha$ is a coefficient of thermo-optic refractive index change per unit heater power and $\lambda_0=1550.1$ nm, respectively. FIG. 15b shows an example of the thermo-optic phase scanning measurement. The first extinction point indicated by $H_0$ corresponds to the point at which the phase error is compensated for. The power between two adjacent extinction points $H_T$ corresponds to an optical path length change with $\lambda_0$. $\delta\phi_k$ is then given by $\delta\phi_k=2\pi\cdot H_0/H_T$. Effective-index fluctuation is obtained as $\delta n_c(k)=(\delta\phi_k/L_k)\lambda_0/2\pi$. Measured $\delta n_c(k)$ in the MZI array is shown in FIG. 14a.

Figure 14D:
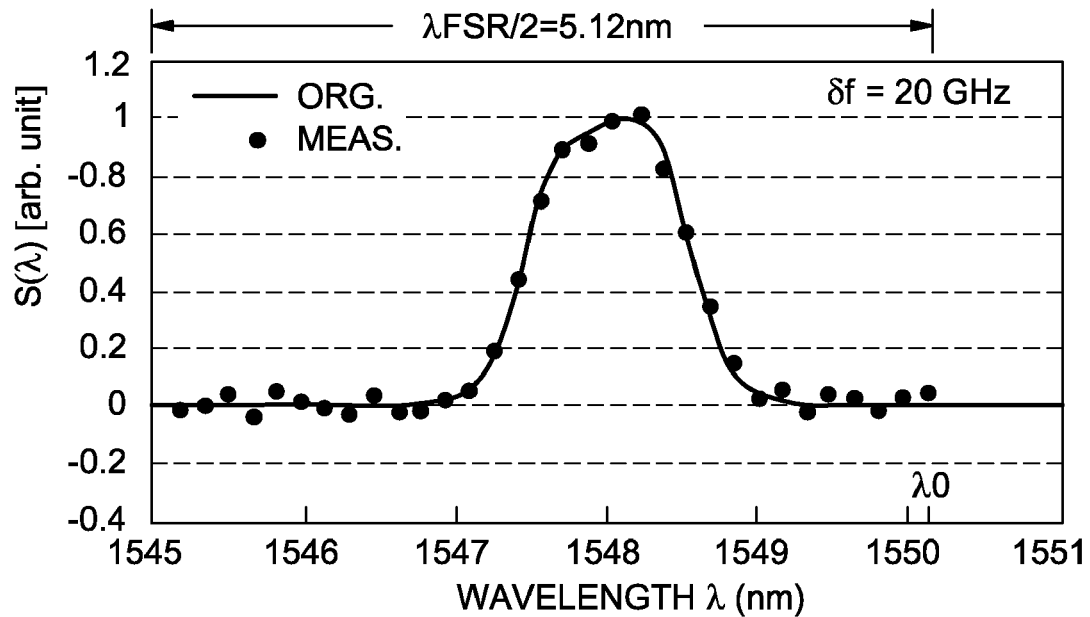

A major advantage of the waveguide SHS based on Fourier-transform spectroscopy is that the interferometer defects due to effective-index fluctuations can be corrected in the data processing stage. As an example, an input signal spectrum as shown in FIG. 14b was coupled into the waveguide SHS. The retrieved signal spectrum $s(\lambda_n)$ ($\lambda_n=c/f_n$) is shown in FIG. 14c. A Hanning window was multiplied to $P(k)$ so as to reduce oscillatory features in the retrieved spectrum. FSR in terms of wavelength is $\lambda_{FSR}=10.24$ nm. Signals in the range of $\lambda=1539.9\sim1545.04$ nm are not shown in FIG. 14c since they are the mirrored replica of the spectrum in $\lambda=1545.2\sim1550.1$ nm. Deviation of the measured spectrum from the original one is mainly due to the phase error $\delta\phi_k$ since they can not be directly included in the cosine FFT analysis. The measured MZI output should be located at $k+\delta n_c L_k/n_c\Delta L$ instead of the ideal position k. The correction can be done by using the measured data and the Lagrange interpolation to replace the unevenly spaced interferogram points by the evenly spaced ones. Fourier transform algorithms can then be applied to the evenly spaced interferogram points. For a large number of data points as in the bulk-optic Fourier transform spectroscopy, an FFT-based procedure is a prerequisite. However, for small number of N, a discretized form of Eq. (25) including phase errors, $$P(k) = \frac{1}{S}\sum_{n=0}^{N-1}\frac{s(f_n)}{2}\left[1+\cos\left(2\pi\frac{nk}{\hat{N}}+\delta\phi_k\right)\right] \quad (k=0\sim N-1) \quad (28)$$

can be solved by N×N simultaneous equations. The signal spectrum corrected with the above procedure is shown in FIG. 14d. The main part of the spectrum is accurately retrieved. Some oscillatory features in the peripheral spectral regions may be caused by the imperfection of the 3-dB couplers and differential attenuation in longer asymmetrical MZIs.

Disclosed herein is a novel planar waveguide spectrometer with an interleaved MZI array. In one embodiment, a 32-ch, 20-GHz spectrometer is implemented in a silica PLC. Accurate signal spectra can be successfully retrieved by correcting the MZI output data with the phase error values. Miniature spectrometers will be important for daily health care and environmental sensing applications since they are compact in size and potentially very low-cost (disposable).

All of these variations disclosed above are considered a part of the claimed invention, and can be used separately or in any combination.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A transform spectrometer implemented on a planar waveguide circuit (PLC), comprising:
   an input optical signal waveguide carrying an input optical signal to be analyzed;
   a plurality of couplers, each connected to the input optical signal waveguide, and each including a coupler output for carrying a coupled optical signal related to the input optical signal;
   an array of interleaved, asymmetrical waveguide Mach-Zehnder interferometers (MZI), each having at least one input MZI waveguide, each MZI input waveguide receiving a coupled optical signal from a respective coupler output;
   wherein at least some of the input MZI waveguides intersect in a common layer of the PLC, at an angle which allows their respective coupled optical signals to transmit.

2. The spectrometer of claim 1, wherein the input MZI waveguides intersect with each other greater than about 45°.

3. The spectrometer of claim 1, further comprising:
   dummy crossing waveguides placed such that the total number of waveguide crossings is equal for each MZI waveguide.

4. A three dimensional spectrometer system, containing multiple PLCs, each having a transform spectrometer as recited in claim 1.

5. The three dimensional spectrometer system of claim 4, wherein the multiple PLCs are stacked in the system.

6. The spectrometer of claim 1, further comprising:
   a plurality of output MZI waveguides coupled to the plurality of MZIs;
   a detector array for receiving output optical signals from the plurality of output MZI waveguides; and
   at least one collimating waveguide lens array formed on the PLC adjacent to at least one of the output MZI waveguides, for providing a collimated output signal from the output MZI waveguide to a respective portion of the detector array.

7. The spectrometer of claim 1, further comprising:
   a plurality of heaters, each of which is affixed to a respective MZI, to correct phase errors in the spectrometer.

8. A method of forming a transform spectrometer on a planar waveguide circuit (PLC), comprising:
   forming an input optical signal waveguide carrying an input optical signal to be analyzed;
   forming a plurality of couplers, each connected to the input optical signal waveguide, and each including a coupler output for carrying a coupled optical signal related to the input optical signal;
   forming an array of interleaved, asymmetrical waveguide Mach-Zehnder interferometers (MZI), each having at least one input MZI waveguide, each MZI input waveguide receiving a coupled optical signal from a respective coupler output;
   wherein at least some of the input MZI waveguides intersect in a common layer of the PLC, at an angle which allows their respective coupled optical signals to transmit.

9. The method of claim 8, wherein the input MZI waveguides intersect with each other greater than about 45°.

10. The method of claim 8, further comprising:
    forming dummy crossing waveguides placed such that the total number of waveguide crossings is equal for each MZI waveguide.

11. A method of forming a three dimensional spectrometer system, containing multiple PLCs, each having a transform spectrometer formed as recited in claim 8.

12. The method of claim 11, further comprising stacking the multiple PLCs in the system.

13. The method of claim 8, further comprising:
    forming a plurality of output MZI waveguides coupled to the plurality of MZIs;
    forming a detector array for receiving output optical signals from the plurality of output MZI waveguides; and
    forming at least one collimating waveguide lens array on the PLC adjacent to at least one of the output MZI waveguides, for providing a collimated output signal from the output MZI waveguide to a respective portion of the detector array.

14. The method of claim 8, further comprising:
    forming a plurality of heaters, each of which is affixed to a respective MZI, to correct phase errors in the spectrometer.

* * * * *